US009725643B2

(12) United States Patent
De Wolf et al.

(10) Patent No.: US 9,725,643 B2
(45) Date of Patent: Aug. 8, 2017

(54) FOAM OR VISCOSIFIED COMPOSITION CONTAINING A CHELATING AGENT

(71) Applicant: Akzo Nobel Chemicals International B.V., Amersfoort (NL)

(72) Inventors: Cornelia Adriana De Wolf, Eerbeek (NL); Hisham Nasr-El-Din, College Station, TX (US); Edwin Rudolf Antony Bang, Arnhem (NL); Guanqun Wang, College Station, TX (US); Josef Johannes Maria Baltussen, Nijmegen (NL); Conrardus Hubertus Joseph Theeuwen, Duiven (NL); Boen Ho O, Utrecht (NL); Marcel Cornelis Paulus Van Eijk, Wageningen (NL)

(73) Assignee: AKZO NOBEL CHEMICALS INTERNATIONAL, B.V., Arnhem (NL)

( * ) Notice: Subject to any disclaimer, the term of this patent is extended or adjusted under 35 U.S.C. 154(b) by 44 days.

(21) Appl. No.: 14/395,740

(22) PCT Filed: Apr. 24, 2013

(86) PCT No.: PCT/EP2013/058455
§ 371 (c)(1),
(2) Date: Oct. 20, 2014

(87) PCT Pub. No.: WO2013/160332
PCT Pub. Date: Oct. 31, 2013

(65) Prior Publication Data
US 2015/0080271 A1    Mar. 19, 2015

Related U.S. Application Data
(60) Provisional application No. 61/639,460, filed on Apr. 27, 2012.

(30) Foreign Application Priority Data
May 11, 2012  (EP) ..................................... 12167695

(51) Int. Cl.
C09K 8/72 (2006.01)
C09K 8/536 (2006.01)
C09K 8/70 (2006.01)
C09K 8/76 (2006.01)
C09K 8/94 (2006.01)

(52) U.S. Cl.
CPC .............. *C09K 8/725* (2013.01); *C09K 8/536* (2013.01); *C09K 8/703* (2013.01); *C09K 8/76* (2013.01); *C09K 8/94* (2013.01)

(58) Field of Classification Search
None
See application file for complete search history.

(56) References Cited

U.S. PATENT DOCUMENTS

| | | | |
|---|---|---|---|
| 5,529,122 | A | 6/1996 | Thach |
| 5,894,888 | A | 4/1999 | Wiemers et al. |
| 6,302,209 | B1 | 10/2001 | Thompson et al. |
| 6,460,632 | B1 | 10/2002 | Chatterji et al. |
| 7,514,390 | B2 | 4/2009 | Chan |
| 7,718,582 | B2 | 5/2010 | Le et al. |
| 7,886,824 | B2 | 2/2011 | Kakadjian et al. |
| 7,998,909 | B2 | 8/2011 | Lin et al. |
| 2008/0146465 | A1 | 6/2008 | Fu et al. |
| 2008/0280789 | A1 | 11/2008 | Welton et al. |
| 2008/0314594 | A1 | 12/2008 | Still et al. |
| 2009/0023613 | A1 | 1/2009 | Li et al. |
| 2011/0284222 | A1 | 11/2011 | Chaabouni et al. |

FOREIGN PATENT DOCUMENTS

| | | |
|---|---|---|
| CN | 101323780 B | 8/2008 |
| CN | 102094614 A | 12/2009 |
| RU | 2247833 C1 | 9/2003 |

(Continued)

OTHER PUBLICATIONS

Wayne Frenier et al., "Hot Oil and Gas Wells Can be Stimulated Without Acids," SPE Production & Facilities 19 (4), Nov. 2004, p. 189-199. DOI:10.2118/86522-PA.

M.A. Kellard, "Production Chemicals for the Oil and Gas Industry", Acid Stimulation, p. 162-171.

Tuna Eren, "Foam Characterization: Bubble Size and Texture Effects," Internet publication on foaming, Thesis Submitted to Graduate School of Natural and Applied Sciences of Middle East Technical University, Sep. 2004.

HLB & Emulsification, Description of Hydrophile, Lipophile Balance and Use of HLB in Producing Emulsions, "Technical Information Surface Chemisty", table A-D (www.scribd.com/doc/56449546/HLB-Emulsification).

(Continued)

*Primary Examiner* — John J Figueroa
(74) *Attorney, Agent, or Firm* — Sandra B. Weiss

(57) ABSTRACT

The present invention relates to a foam containing water, between 5 and 30 wt % on total weight of the foam of a chelating agent selected from the group of glutamic aid N,N-diacetic acid or a salt thereof (GLDA), aspartic acid N,N-diacetic acid or a salt thereof (ASDA), methylglycine N,N-diacetic acid or a salt thereof (MGDA), N-hydroxyethyl ethylenediamine-N,N',N'-triacetic acid or a salt thereof (HEDTA), a foaming agent, and at least 25 vol % on total volume of the foam of a gas, and having a pH of between 2 and 5, to a viscosified composition containing water, between 5 and 30 wt % on total volume of the composition of a chelating agent selected from the group of glutamic aid N,N-diacetic acid or a salt thereof (GLDA), aspartic acid N,N-diacetic acid or a salt thereof (ASDA), methylglycine N,N-diacetic acid or a salt thereof (MGDA), N-hydroxyethyl ethylenediamine-N,N',N'-triacetic acid or a salt thereof (HEDTA), and at least 0.01 wt % on total weight of the composition of a viscosifying agent, and having a pH of between 2 and 5, and to a process for treating a subterranean formation comprising introducing the above foam or viscosified composition into the formation.

11 Claims, No Drawings

(56) References Cited

FOREIGN PATENT DOCUMENTS

| | | |
|---|---|---|
| RU | 2373385 C1 | 2/2008 |
| RU | 2391499 C2 | 3/2008 |
| WO | 2005/001242 A1 | 1/2005 |
| WO | 2006/085132 A1 | 8/2006 |
| WO | 2007/020592 A2 | 2/2007 |
| WO | 2007/056284 A2 | 5/2007 |
| WO | 2008/015464 A1 | 2/2008 |
| WO | 2008/035253 A2 | 3/2008 |
| WO | 2008/092078 A1 | 7/2008 |
| WO | 2009/029694 A1 | 3/2009 |
| WO | 2009/077958 A1 | 6/2009 |
| WO | 2012/080197 A1 | 6/2012 |
| WO | 2013/116422 A1 | 8/2013 |

OTHER PUBLICATIONS

M.P. Allen and D.J. Tildesley, "Computer Simulation of Liquids", Clarendon Press—Oxford 1987.

FOAM OR VISCOSIFIED COMPOSITION CONTAINING A CHELATING AGENT

This application is a National Stage entry of International Application PCT/EP2013/058455, filed Apr. 24, 2013, which claims the benefit of U.S. Provisional Patent Application No. 61/639,460, filed Apr. 27, 2012, and European Patent Application No. 12167695.1, filed May 11, 2012. The contents of the aforementioned applications are incorporated herein by reference in their entireties.

The present invention relates to a foam containing water, between 5 and 30 wt % on total weight of the foam of a chelating agent selected from the group of glutamic acid N,N-diacetic acid or a salt thereof (GLDA), aspartic acid N,N-diacetic acid or a salt thereof (ASDA), methylglycine N,N-diacetic acid or a salt thereof (MGDA), N-hydroxyethyl ethylenediamine-N,N',N'-triacetic acid or a salt thereof (HEDTA), a foaming agent, and at least 25 vol % on total volume of the foam of a gas, and having a pH of between 2 and 5, to a viscosified composition containing water, between 5 and 30 wt % on total weight of the composition of a chelating agent selected from the group of glutamic acid N,N-diacetic acid or a salt thereof (GLDA), aspartic acid N,N-diacetic acid or a salt thereof (ASDA), methylglycine N,N-diacetic acid or a salt thereof (MGDA), N-hydroxyethyl ethylenediamine-N,N',N'-triacetic acid or a salt thereof (HEDTA), and at least 0.01 wt % on total weight of the composition of a viscosifying agent, and having a pH of between 2 and 5, and to a process for treating a subterranean formation with the foam or viscosified composition.

Subterranean formations from which oil and/or gas can be recovered can contain several solid materials contained in porous or fractured rock formations. The naturally occurring hydrocarbons, such as oil and/or gas, are trapped by the overlying rock formations with lower permeability. The reservoirs are found using hydrocarbon exploration methods and often one of the purposes of withdrawing the oil and/or gas therefrom is to improve the permeability of the formations. The rock formations can be distinguished by their major components and one category is formed by so-called sandstone formations, which contain siliceous materials (like quartz) as the major constituent, while another category is formed by so-called carbonate formations, which contain carbonates (like calcite, chalk, and dolomite) as the major constituent. A third category is formed by shales, which contain very fine particles of many different clays covered with organic materials to which gas and/or oil are adsorbed. Shale amongst others contains many clay minerals like kaolinite, illite, chlorite, and montmorillonite, as well as quartz, feldspars, carbonates, pyrite, organic matter, and cherts.

One process to make formations more permeable is a matrix-acidizing process, wherein an acidic fluid is introduced into the formations trapping the oil and/or gas. Acidic treatment fluids are known in the art and are for example disclosed in several documents that disclose acid treatment with HCl. For example, Frenier, W. W., Brady, M., Al-Harthy, S. et al. (2004), "Hot Oil and Gas Wells Can Be Stimulated without Acids," *SPE Production & Facilities* 19 (4): 189-199. DOI: 10.2118/86522-PA, show that formulations based on the hydroxyethyl-aminocarboxylic acid family of chelating agents can be used to increase the production of oil and gas from wells in a variety of different formations, such as carbonate and sandstone formations.

However, in a number of instances a subterranean formation is damaged during drilling and/or completing the well, when a filter cake is first created in the formation and subsequently removed, any other treatment, or sometimes a well can even become damaged simply after prolonged well operation.

When a next acidizing or stimulation fluid is then injected into the formation, the fractures and/or high permeability zones may draw the acid away from the damaged, lower permeability zones, due to lack of diversion, while the aim of acid treatments is that the acid creates a diverse wormhole network in the carbonate formation or that it reaches the acid-soluble parts of sandstone formations and finds and creates as many alternative ways into the formation as possible.

At the same time, when treating a subterranean formation with a fluid at a pressure higher than the fracture pressure of the formation (i.e. fracturing the formation), it is also undesired to use a standard acidic treatment fluid for injection into the formation as these fluids can leak off into the formation and prevent the desired pressure build-up.

For these reasons there is a need in the art to make treatment compositions that do not show the undesired behaviour of the state of the art fluids and that remove the filter cake completely without or prior to attacking the formation itself during completion operations, can increase the permeability of formations with a high permeability ratio by diverting the fluid towards the more damaged zones during acidizing operations, and reduce the leak-off during fracturing treatments.

US 2008/0146465 discloses a viscosified acidic treatment composition wherein the acid is HCl. CN 102094614 and RU 2391499, according to their abstracts, appear to disclose that a foam can be made from normal acidic liquids that are used in oil and gas wells. Some other documents, like U.S. Pat. No. 6,460,632 and U.S. Pat. No. 5,529,122, suggest that making foam of acidic treatment fluids is hardly possible.

US 2008/0280789 discloses methods for stimulating oil or gas production using a viscosified aqueous fluid with a chelating agent to remove scale from the tubular or equipment. The document mentions that the pH of the viscosified fluids is at least 2, preferably at least 5, and most preferably between 6 and 12. In addition, the document discloses that the chelating agent can be present in an amount of between 1 and 80 wt %. Several chelating agents are listed as suitable examples, including HEDTA and GLDA. The document also mentions making a foam of the chelating agent-containing fluids. The one and only Example in the document involves making a viscosified composition containing about 25 wt % of the chelating agent EDTA and xanthan as viscosifying agent in the presence of a significant amount of potassium hydroxide, resulting in a pH of about 6. The document does not contain a clear and unambiguous disclosure of acidic chelating agent compositions that are viscosified or foamed and that are of use in acidic treatments of subterranean formations such as matrix-acidizing or acid-fracturing.

The present invention aims to provide improved acidic and chelating agent-based foams and viscosified compositions that are suitable for use in treating subterranean formations, such as filter cake removal, matrix acidizing or acid fracturing.

The invention now provides a foam containing water, between 5 and 30 wt % on total weight of the foam of a chelating agent selected from the group of glutamic acid N,N-diacetic acid or a salt thereof (GLDA), aspartic acid N,N-diacetic acid or a salt thereof (ASDA), methylglycine N,N-diacetic acid or a salt thereof (MGDA), N-hydroxyethyl ethylenediamine-N,N',N'-triacetic acid or a salt thereof (HEDTA), a foaming agent, and at least 25 vol % on total volume of the foam of a gas, and having a pH of between 2 and 5, and it provides a viscosified composition containing water, between 5 and 30 wt % on total weight of the composition of a chelating agent selected from the group of glutamic acid N,N-diacetic acid or a salt thereof (GLDA), aspartic acid N,N-diacetic acid or a salt thereof (ASDA), methylglycine N,N-diacetic acid or a salt thereof (MGDA), N-hydroxyethyl ethylenediamine-N,N',N'-triacetic acid or a salt thereof (HEDTA), and at least 0.01 wt % on total weight of the composition of a viscosifying agent, and having a pH of between 2 and 5, which foam or viscosified composition can be used in a process to treat subterranean formations. In a preferred embodiment, the foams of the present invention additionally contain at least 0.01 wt % on total weight of the foam of a viscosifying agent.

It is understood that foams like viscosified compositions also have a viscosity higher than the liquid not containing the foaming agent. In this document foams are defined as viscosified compositions that contain an intentionally added gas.

It was found that, contrary to many state of the art foamed or viscosified acids, also in the acidic pH range the compositions of this invention containing a significant amount of chelating agent are easier to foam and viscosify at elevated temperatures, which is a benefit when they are used in subterranean formations, where the temperature is generally higher than room temperature. Furthermore, it was found that the foams or viscosified compositions of the invention have an excellent balance between the stability of the foam and/or the increased viscosity and an adjustable breakdown thereof to again give the lower viscous solutions, which is a benefit in formation treatment applications, as then the foams or viscosified compositions do not block or plug the less permeable parts of a formation unnecessarily long. Also for this reason in many embodiments they need a lower amount of breakers than state of the art foams or viscosified compositions. Also, it was found that during completion treatments the foams or viscosified compositions of the invention dissolve the filter cake more selectively and more completely without causing unwanted dissolution of the formation in comparison with compositions that are not foamed or viscosified.

Additionally, it was found that during matrix-acidizing treatments the foams or viscosified compositions of this invention are better diverted into the low-permeability zones, giving a more diverse network of wormholes or dissolution in formations with a high permeability ratio, i.e. formations with a heterogeneous permeability. This results in a better flow of gas or oil from both the initially high-permeability and the low-permeability zones. Due to the improved diversion a lower volume of acid is needed to conduct the matrix stimulation job.

Furthermore, it was found that the foams or viscosified compositions of the invention are better at preventing fluid leak-off during (acid) fracturing treatments and allow the pressure to build up to above the fracture pressure of the formation, or at least, require fewer fluid loss additives.

In a large number of embodiments, it was established that the viscosifying agent and the chelating agent in combination had a better viscosity build-up than any of these components separately, i.e. worked synergistically.

Finally, it was found that the foams or viscosified compositions have an excellent combination of properties to improve the permeability of the formations by a combination of hydraulic and acid fracturing.

Accordingly, the present invention additionally provides a process for treating a subterranean formation comprising introducing a foam containing water, between 5 and 30 wt % on total weight of the foam of a chelating agent selected from the group of glutamic acid N,N-diacetic acid or a salt thereof (GLDA), aspartic acid N,N-diacetic acid or a salt thereof (ASDA), methylglycine N,N-diacetic acid or a salt thereof (MGDA), N-hydroxyethyl ethylenediamine-N,N', N'-triacetic acid or a salt thereof (HEDTA), a foaming agent, and at least 25 vol % on total volume of the foam of a gas, and having a pH of between 2 and 5 into the formation. Also, the present invention gives a process for treating a subterranean formation comprising introducing a viscosified composition containing water, between 5 and 30 wt % on total weight of the composition of a chelating agent selected from the group of glutamic acid N,N-diacetic acid or a salt thereof (GLDA), aspartic acid N,N-diacetic acid or a salt thereof (ASDA), methylglycine N,N-diacetic acid or a salt thereof (MGDA), N-hydroxyethyl ethylenediamine-N,N',N'-triacetic acid or a salt thereof (HEDTA), and at least 0.01 wt % on total weight of the composition of a viscosifying agent, and having a pH of between 2 and 5 into the formation. Furthermore, the present invention provides a process for treating a subterranean formation comprising introducing a foam containing water, between 5 and 30 wt % on total weight of the foam of a chelating agent selected from the group of glutamic acid N,N-diacetic acid or a salt thereof (GLDA), aspartic acid N,N-diacetic acid or a salt thereof (ASDA), methylglycine N,N-diacetic acid or a salt thereof (MGDA), N-hydroxyethyl ethylenediamine-N,N',N'-triacetic acid or a salt thereof (HEDTA), a foaming agent, at least 0.01 wt % on total weight of the foam of a viscosifying agent, and at least 25 vol % on total volume of the foam of a gas, and having a pH of between 2 and 5 into the formation.

Surprisingly, it was found to be possible to make foams or viscosified compositions from these chelating agents which are more suitable for treating a subterranean formation than those made from state of the art acidizing fluids like HCl-based fluids. Besides, it was found that the foams and viscosified compositions containing the chelating agents of the present invention give a better performance in treating subterranean formations in that they give an improved permeability, require fewer further additives, which was not expected given the fact that chelating agents carry opposite charges in their molecular structure, i.e. contrary to many other acids have a molecular structure in which the nitrogen atom is regularly slightly positively charged and the carboxylate group is negatively charged, depending on the pH of the solution.

It should be noted that a few documents, like U.S. Pat. No. 7,718,582, suggest that foams can be made that contain a chelating agent as an additive; however, these documents disclose neither that the chelating agent is used in high amounts as in the present invention, nor that the chelating agent can be applied as an acidizing or acid-fracturing component, and additionally these documents do not provide any examples by which the presence of the chelating agent is supported.

The amounts of chelating agent, foaming agent, and viscosifying agent in wt % or ppm are based on the total weight of the foam or composition in which they are present, the amount of gas in vol % is on the basis of the total volume of the foam. Viscosified composition is defined in this application as a composition that has a higher viscosity than the same composition without a viscosifying agent when using an AR2000 rheometer from TA instruments using a cone and plate geometry at 20° C. or another relevant temperature as specified herein, wherein the cone was stainless steel with a 40 mm diameter and a 4° angle (SST 40 mm 4°) and heating was done using a Peltier element. The test was applied by varying the shear rate from 0.1 to 1000 s$^{-1}$. Preferably, the viscosity of the viscosified composition is higher than 10 mPa·s, more preferably higher than 50 mPa·s at a shear rate of 100 s$^{-1}$.

The subterranean formation in one embodiment can be a carbonate formation, a shale formation, or a sandstone formation and in a preferred embodiment is any of these formations with a high permeability ratio (>6) or a low permeability (<0.1 mD for gas-containing formations or <10 mD for oil-containing formations). Formations with a low permeability or formations that have a special design (like formations that are confined within shale layers) are often subjected to a fracturing operation, and in these operations the foams and viscosified compositions of the present invention are especially useful.

The term treating in this application is intended to cover any treatment of the formation with the foam or viscosified composition. It specifically covers treating the formation with the foam to achieve at least one of (i) an increased permeability, (ii) the removal of small particles, and (iii) the removal of inorganic scale, and so enhance the well performance and enable an increased production of oil and/or gas from the formation. At the same time, it may cover cleaning of the wellbore and descaling of the oil/gas production well and production equipment.

The chelating agent is present in the foam or viscosified composition in an amount of between 5 and 30 wt %, more preferably between 10 and 30 wt %, even more preferably between 15 and 25 wt %, on the basis of the total weight of the foam or composition. The gas is preferably present in the foam in an amount of between 50 and 99 vol %, preferably between 50 and 80 vol %, even more preferably 60-70 vol % on total foam volume.

The foaming agent in one embodiment is a surfactant.

Preferably, it is a water-soluble surfactant as the foams of the invention are preferably water-based. Water-soluble means for this invention: soluble in an amount of at least 2 g/l of water.

The foaming agent in one embodiment is used in an amount of between 10 ppm and 200,000 ppm on the basis of the total weight of the foam, preferably between 10 ppm and 100,000 ppm, even more preferably 100 and 50,000 ppm, most preferably between 100 and 10,000 ppm.

The viscosifying agent is preferably present in an amount of between 0.01 and 3 wt %, more preferably between 0.01 and 2 wt %, even more preferably between 0.05 and 1.5 wt % on total weight of the viscosified composition or foam.

The chelating agent in a preferred embodiment is GLDA, ASDA or HEDTA, more preferably GLDA or HEDTA, even more preferably GLDA.

The gas in one embodiment is selected from the group of $N_2$, CO, $CO_2$, natural gas, oxygen or mixtures thereof, like air. Preferably, $N_2$, $CO_2$, air, or natural gas is used.

The viscosifying agent in one embodiment can be chosen from the group of carbohydrates such as polysaccharides, cellulosic derivatives, guar or guar derivatives, xanthan, carrageenan, starch polymers, gums, polyacrylamides, polyacrylates, betaine-based surfactants, viscoelastic surfactants and/or natural or synthetic clays.

Foam formation can be achieved along several routes. In one embodiment, a suitable foam is obtained by including a mixture of surfactants as foaming agents into the solution containing the chelating agent. Suitable surfactants may be anionic, cationic, amphoteric or nonionic in nature, or their mixtures. The person skilled in the art is fully aware that in the case of surfactants having opposite charges, a non-stoichiometric ratio must be chosen. Preferably, the molar ratio is higher than 3 to 1. More preferably, it is higher than 5:1 and most preferably, it is higher than 10:1. It is also preferred that the surfactant mixture is soluble in water (i.e. in an amount of at least 2 g/l water, preferably at least 10 g/l of water). It is more preferred that the surfactant mixture is soluble in the aqueous system containing up to 5% on total weight of a chelating agent. Suitable surfactant mixtures may be mixtures of surfactants which are all soluble in the described solutions. However, surfactant mixtures may also contain one or more (co-)surfactants which are insoluble in the described solutions. It is known to the person skilled in the art that the portion of insoluble surfactants is bound to limits. When expressed in weight ratios, the preferred ratio of insoluble to soluble surfactant is less than 2. More preferably, it is less than 1 and most preferably, it is less than ⅓ (one third).

It is common to express the property of a surfactant mixture by its hydrophilic-lipophilic balance, the so-called HLB. The HLB of non-ionic surfactants can be simply calculated by applying Griffin's formulae:

HLB=20×(molar mass of the hydrophilic portion of the molecule)/(molar mass of the molecule)

Example
Decylalcohol ethoxylate (8EO): $C_{10}$-$EO_8$
Hydrophobic part: $CH_3(CH_2)_9$—OH molar mass=158
Hydrophilic part: $[CH_2CH_2O]_8$ molar mass=352
HLB for $C_{10}$-$EO_8$ is 20×352/(352+158)=13.8
The HLB of surfactants having ionic portions is calculated by Davis formulae rather than Griffin's:

HLB=7+Σ(Hydrophilic group contributions)−Σ(Hydrophobic group contributions), in which case the following tables need to be used in finding the increments, see Tables A-D in Technical Information Surface Chemistry: HLB & Emulsification, link: http://www.scribd.com/doc/56449546/HLB-Emulsification.

Table A has been retrieved:

TABLE A

| anionic hydrophilic group contributions | | | |
|---|---|---|---|
| hydrophilic group contribution | HLB | hydrophilic group contribution | HLB |
| —COO—$Na^+$ | 19.1 | —$SO_3$—$Na^+$ | 20.7 |
| | | —O—$SO_3$—$Na^+$ | 20.8 |

Example
Tetradecyl ammonium chloride: $C_{14}$—$N(CH_3)_3^+Cl^-$
  Group Contributions of the Hydrophobic Groups:
—CH3: 1×0.475
—CH2-: 13×0.475
  Group Contributions of the Hydrophilic Groups:
—$N(CH_3)_3^+Cl^-$ 22.0
HLB for $C_{14}$—$N(CH_3)_3^+Cl^-$ is 7+22.0−(14×0.475)=22.4
The HLB of surfactant mixtures is simply the weight average of the HLBs of the individual surfactant types.
  A preferred surfactant or surfactant mixture in the present invention has an HLB in the range of 7 to 25. More preferably, it is in the range of 9 to 25. The most preferred HLB range is in-between 10 and 22.

In a further preferred embodiment, the surfactant or surfactant mixture in the present invention is chosen on the basis of the critical packing parameter (CPP) to be at least 0.33. More preferably, the CPP is at least 0.5. The CPP is defined as the volume of the hydrophobic portion of the surfactant divided by the length of this portion and the area of the hydrophilic portion. There are a number of methods for the determination of the CPP of individual types of surfactants. For this invention one applies the molecular modeling module Discover® in Material Studio (Material Studio v4.3.0.0 ex Accelrys Software). The surfactant molecule is modeled by defining the atoms and assuming a harmonic potential for the bonds using the PCFF force field. Discover® may be used to find the local energy minimum of the surfactant molecular structure. The starting point for the minimization is an extended conformation of the hydrophobic portion. Thereafter, the three necessary parameters, the volume and length of the hydrophobic portion and the area of the hydrophilic portion, are calculated. A detailed description of the method is found in M. P. Allen, D. J. Tildesley, Computer Simulation of Liquids, Oxford University Press, 1987. The effective CPP of a surfactant mixture is found by calculating the molar weighted CPP of the surfactants in the mixture. Reference is made to WO 2012080197 for a further explanation of CPP and for examples of surfactants and surfactant mixtures that have the CPP range as preferred in the present invention.

In another embodiment, a suitable foam is obtained by including polymeric surfactants. Examples of polymeric surfactants are partially hydrolyzed polyvinyl acetate, partially hydrolyzed modified polyvinyl acetate, block or co-polymers of polyethane, polypropane, polybutane or polypentane, proteins, and partially hydrolyzed polyvinyl acetate, polyacrylate and derivatives of polyacrylates, polyvinyl pyrrolidone and derivatives. The additional application of further surfactants to the polymeric surfactant is beneficial to the foam quality or lifetime. In yet another embodiment, a suitable foam is obtained by including colloidal solid dispersions. The person skilled in the art is capable of selecting the proper colloidal solid dispersion by determining the particle size and the contact angle. The smaller the particles, the better they are. Large particles do not create a colloidal solid dispersion and will not stabilize foam. Preferably, the particle size as expressed by the d50 of the colloidal dispersion is smaller than 10 µm. More preferably, it is smaller than 3 µm. Even more preferably, it is smaller than 1 µm. Most preferably, particles are smaller than 0.3 µm. The contact angle is defined as the angle between the aqueous solution and air (or gas) interface and the particle surface. This angle is equal to "0°" (zero degrees) when the particle is borderline immersed in the aqueous solution and tips the solutions' surface. The contact angle is 180° when the particle is (borderline) pulled out of the aqueous solution. Preferably, the contact angle is between 0° and 90°. More preferably, it is between 1° and 90°. Most preferably, it is between 2° and 89°. Particles may be not be spherical in shape. Then the contact angle is an averaged value. The method to find the contact angle as suitable for the present invention is the Washburn method, see also http://www.kruss.de/en/theory/measurements/surface-tension/contact-angle-measurement.html. Examples of suitable colloidal solid dispersions include, but are not limited to, colloidal silica and chemically modified colloidal silica, colloidal silicates and their chemically modified versions. Special modification techniques to obtain so-called "Janus particles" are preferred.

In a further embodiment, a combination of colloidal solid silica, surfactants and/or polymeric surfactant is used.

It may be that a well chosen combination of foaming agent and viscosifying agent may result in a synergistic effect of enhanced viscosity and or enhanced foaming or enhanced foam stability. Thus, in an even more preferred embodiment, the composition of the invention contains a combination of a foaming agent and a viscosifying agent, the foaming agent and the viscosifying agent being chosen from the group of foaming agents and viscosifying agents as further specified in this document.

In yet another preferred embodiment, the foaming agent and/or the viscosifying agent are present together with an additional surfactant, which can be a nonionic, anionic, cationic, or amphoteric surfactant.

In another embodiment, the foam of the present invention contains a foam extender. Foam extenders are known in the art and are for example disclosed in WO 2007/020592. Suitable foam extenders are co-surfactants, viscous materials like glycerol, crystalline phases or particles.

For preparing the foams of the invention, preferably in a first step a foam is made of water and the foaming agent to which in a subsequent step (a liquid containing) the chelating agent is added under proper mixing and/or gas injection. For some foaming agents, especially cationic foaming agents, however, it may be better to add the foaming agent directly to the aqueous liquid containing (part of) the chelating agent, as they may benefit from the presence of the chelating agent in the generation of the foam-like properties. As also known by the person skilled in the art to create the foam, in some embodiments it is a benefit to add a small amount of an insoluble compound, salt or hydrophobic compound to the liquid before the gaseous component is added to the solution to be foamed.

As already briefly summarized above, the viscosifying agents include chemical species which are soluble, at least partially soluble and/or insoluble in the chelating agent-containing starting fluid. The viscosifying agents may also include various insoluble or partially soluble organic and/or inorganic fibres and/or particulates, e.g., dispersed clay, dispersed minerals, and the like, which are known in the art to increase viscosity. Suitable vicosifying agents further include various organic and/or inorganic polymeric species including polymer viscosifying agents, especially metal-crosslinked polymers. Suitable polymers for making the metal-crosslinked polymer viscosifying agents include, for example, polysaccharides, e.g., substituted galactomannans, such as guar gums, high-molecular weight polysaccharides composed of mannose and galactose sugars, or guar derivatives such as hydroxypropyl guar (HPG), carboxymethyl-hydroxypropyl guar (CMHPG), and carboxymethyl guar (CMG), hydrophobically modified guars, guar-containing compounds, and synthetic polymers. Crosslinking agents which include boron, titanium, zirconium and/or aluminium complexes are preferably used to increase the effective molecular weight of the polymers and make them better suited for use as viscosity increasing agents, especially in high-temperature wells. Other suitable classes of water-soluble polymers effective as viscosifiers include polyvinyl alcohols at various levels of hydrolysis, polyvinyl polymers, polymethacrylamides, cellulose ethers, lignosulfonates, and ammonium, alkali metal, and alkaline earth salts thereof, polyethyleneimines, polydiallyldimethylammonium chloride, polyamines like copolymers of dimethylamine and epichlorohydrin, copolymers of acrylamide and cationic monomers, like diallyldimethylammonium chloride (DADMAC) or acryloyloxyethyltrimethyl ammonium chloride, copolymers of acrylaimide containing anionic as well as cationic groups. More specific examples of other typical water-soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkylene oxides, other galactomannans, heteropolysaccharides obtained by the fermentation of starch-derived sugar and ammonium and alkali metal salts thereof. In embodiments disclosed herein, cellulose derivatives are used, including hydroxyethyl cellulose (HEC), hydroxypropyl cellulose (HPC), carboxymethyl-hydroxyethyl cellulose (CMHEC) and/or carboxymethyl cellulose (CMC), with or without crosslinkers, xanthan, diutan, and scleroglucan are also preferred.

In yet another embodiment, the viscosified composition of the present invention contains a crosslinking agent which is capable of crosslinking the viscosifying agent and therefore can improve the properties of the viscosified composition and in embodiments wherein the foam also contains a viscosifying agent, also the foam. Crosslinking agents are known in the art and are for example disclosed in WO 2007/020592.

The process of the invention is preferably performed at a temperature of between 35 and 400° F. (about 2 and 204° C.), more preferably between 77 and 400° F. (about 25 and 204° C.). Even more preferably, the foams and viscosified compositions are used at a temperature where they best achieve the desired effects, which means a temperature of between 77 and 300° F. (about 25 and 149° C.), most preferably between 150 and 300° F. (about 65 and 149° C.).

The process of the invention when it is an matrix acidizing treatment process is preferably performed at a pressure between atmospheric pressure and fracture pressure, wherein fracture pressure is defined as the pressure above which injection of foams or compositions will cause the formation to fracture hydraulically, and when it is a acid fracturing process is preferably performed at a pressure above the fracture pressure of the producing zone(s). A person skilled in the art will understand that the fracture pressure depends on parameters such as type, depth of the formation, and downhole stresses and can be different for any reservoir.

Salts of GLDA, ASDA, HEDTA, and MGDA that can be used are the alkali metal, alkaline earth metal, or ammonium full and partial salts. Also mixed salts containing different cations can be used. Preferably, the sodium, potassium, and ammonium full or partial salts of GLDA, ASDA, HEDTA, and MGDA are used.

The foams and viscosified compositions of the invention are aqueous foams and compositions, i.e., they preferably contain water as a solvent for the other ingredients, wherein the water can be, e.g., fresh water, aquifer water, produced water, seawater or any combinations of these waters, though other solvents may be added as well, as further explained below.

The pH of the foams and viscosified compositions of the invention and as used in the process can range from 2 to 5. Preferably, however, it is between 3.5 and 5, as in the very acidic range of 2 to 3.5 some undesired side effects may be caused by the foams or viscosified compositions in the formation, such as too fast dissolution of carbonate giving excessive $CO_2$ formation or an increased risk of reprecipitation. In addition, it must be realized that highly acidic solutions are more expensive to prepare and are very corrosive to well completion and tubulars, especially at high temperatures. Consequently, the foam and the viscosified composition even more preferably have a pH of 3.5 to 5.

The foam or viscosified composition may contain other additives that improve the functionality of the stimulation action and minimize the risk of damage as a consequence of the said treatment, as is known to anyone skilled in the art.

It should be understood that the several additives can be part of a main treatment composition but can be included equally well in a preflush or postflush composition. In such embodiments the composition of the invention is effectively a kit of parts wherein each part contains part of the components of the total composition, for example, one part that is used for the main treatment contains the foam or viscosified composition of the invention and one or more other parts contain one or more of the other additives, such as for example a surfactant or mutual solvent.

The foam or viscosified composition of the invention may in addition contain one or more of the group of anti-sludge agents, (water-wetting or emulsifying) surfactants, surfactant mixtures, corrosion inhibitors, mutual solvents, corrosion inhibitor intensifiers, additional foaming agents, viscosifiers, wetting agents, diverting agents, oxygen scavengers, carrier fluids, fluid loss additives, friction reducers, stabilizers, rheology modifiers, gelling agents, scale inhibitors, breakers, salts, brines, pH control additives such as further acids and/or bases, bactericides/biocides, particulates, crosslinkers, salt substitutes (such as tetramethyl ammonium chloride), relative permeability modifiers, sulfide scavengers, fibres, nanoparticles, consolidating agents (such as resins and/or tackifiers), combinations thereof, or the like.

The mutual solvent is a chemical additive that is soluble in oil, water, acids (often HCl-based), and other well treatment fluids (see also www.glossary.oilfield.slb.com). Mutual solvents are routinely used in a range of applications, controlling the wettability of contact surfaces before, during and/or after a treatment, and preventing or breaking up emulsions. Mutual solvents are used, as insoluble formation fines pick up organic film from crude oil. These particles are partially oil-wet and partially water-wet. This causes them to collect materials at any oil-water interface, which can stabilize various oil-water emulsions. Mutual solvents remove organic films leaving them water-wet, thus emulsions and particle plugging are eliminated. If a mutual solvent is employed, it is preferably selected from the group which includes, but is not limited to, lower alcohols such as methanol, ethanol, 1-propanol, 2-propanol, and the like, glycols such as ethylene glycol, propylene glycol, diethylene glycol, dipropylene glycol, polyethylene glycol, polypropylene glycol, polyethylene glycol-polyethylene glycol block copolymers, and the like, and glycol ethers such as 2-methoxyethanol, diethylene glycol monomethyl ether, and the like, substantially water/oil-soluble esters, such as one or more C2-esters through C10-esters, and substantially water/oil-soluble ketones, such as one or more C2-C10 ketones, wherein substantially soluble means soluble in more than 1 gram per liter, preferably more than 10 grams per liter, even more preferably more than 100 grams per liter, most preferably more than 200 grams per liter. The mutual solvent is preferably present in an amount of 1 to 50 wt % on total foam or viscosified composition.

A preferred water/oil-soluble ketone is methylethyl ketone.

A preferred substantially water/oil-soluble alcohol is methanol.

A preferred substantially water/oil-soluble ester is methyl acetate.

A more preferred mutual solvent is ethylene glycol monobutyl ether, generally known as EGMBE The amount of glycol solvent in the foam or composition is preferably about 1 wt % to about 10 wt %, more preferably between 3 and 5 wt %. More preferably, the ketone solvent may be present in an amount from 40 wt % to about 50 wt %; the substantially water-soluble alcohol may be present in an amount within the range of about 20 wt % to about 30 wt %; and the substantially water/oil-soluble ester may be present in an amount within the range of about 20 wt % to about 30 wt %, each amount being based upon the total weight of the solvent in the foam or composition.

The surfactant (both the water-wetting surfactant as well as the surfactants used as foaming agent or viscosifying agent) can be any surfactant known in the art or a mixture thereof and include anionic, cationic, amphoteric, and non-ionic surfactants. The choice of surfactant is initially determined by the nature of the rock formation around the well. The application of cationic surfactants can better be limited in case of sandstone, while in case of carbonate rock anionic surfactants are not preferred. Hence, the surfactant (mixture) is predominantly anionic in nature when the formation is a sandstone formation. When the formation is a carbonate formation, the surfactant (mixture) is preferably predominantly nonionic or cationic in nature, even more preferably predominantly cationic in nature.

The nonionic surfactant of the present composition is preferably selected from the group consisting of alkanolamides, alkoxylated alcohols, alkoxylated amines, amine oxides, alkoxylated amides, alkoxylated fatty acids, alkoxylated fatty amines, alkoxylated alkyl amines (e.g., cocoalkyl amine ethoxylate), alkyl phenyl polyethoxylates, lecithin, hydroxylated lecithin, fatty acid esters, glycerol esters and their ethoxylates, glycol esters and their ethoxylates, esters of propylene glycol, sorbitan, ethoxylated sorbitan, polyglycosides, and the like, and mixtures thereof. Alkoxylated alcohols, preferably ethoxylated alcohols, optionally in combination with (alkyl)polyglycosides, are the most preferred nonionic surfactants.

The anionic surfactants may comprise any number of different compounds, including alkylsulfates, alkylsulfonates, alkylbenzenesulfonates, alkyl phosphates, alkyl phosphonates, alkyl sulfosuccinates.

The amphoteric surfactants include hydrolyzed keratin, taurates, sultaines, phosphatidylcholines, betaines, modified betaines, alkylamidobetaines (e.g., cocoamidopropyl betaine).

The cationic surfactants include alkyl amines, alkyl dimethylamines, alkyl trimethyl amines (quaternary amines), alkyl diethanolamines, dialkylamines, dialkyldimethylamines and less common classes based on phosphonium, sulphonium. In preferred embodiments, the cationic surfactants may comprise quaternary ammonium compounds (e.g., trimethyl tallow ammonium chloride, trimethyl coco ammonium chloride), derivatives thereof, and combinations thereof.

Suitable surfactants may be used in a liquid or solid, like powder, granule or particulate, form.

Where used not as the foaming or viscosifying agent but for other purposes, the surfactants may be present in the foam or composition in an amount sufficient to prevent incompatibility with formation fluids, other treatment fluids, or wellbore fluids at reservoir temperature.

In an embodiment where liquid surfactants are used, the surfactants are generally present in an amount in the range of from about 0.01% to about 5.0% by volume of the foam or composition.

In one embodiment, the liquid surfactants are present in an amount in the range of from about 0.1% to about 2.0% by volume of the foam or composition, more preferably between 0.1 and 1 volume %.

In embodiments where powdered surfactants are used, the surfactants may be present in an amount in the range of from about 0.001% to about 0.5% by weight of the foam or composition.

The anti-sludge agent can be chosen from the group of mineral and/or organic acids used to stimulate sandstone hydrocarbon bearing formations. The function of the acid is to dissolve acid-soluble materials so as to clean or enlarge the flow channels of the formation leading to the wellbore, allowing more oil and/or gas to flow to the wellbore.

Problems can be caused by the interaction of the (usually concentrated, 20-28%) stimulation acid and certain crude oils (e.g. asphaltic oils) in the formation to form sludge. Interaction studies between sludging crude oils and the introduced acid show that permanent rigid solids are formed at the acid-oil interface when the aqueous phase is below a pH of about 4. No films are observed for non-sludging crudes with acid.

These sludges are usually reaction products formed between the acid and the high molecular weight hydrocarbons such as asphaltenes, resins, etc.

Methods for preventing or controlling sludge formation with its attendant flow problems during the acidization of crude-containing formations include adding "anti-sludge" agents to prevent or reduce the rate of formation of crude oil sludge, which anti-sludge agents stabilize the acid-oil emulsion and include alkyl phenols, fatty acids, and anionic surfactants. Frequently used as the surfactant is a blend of a sulfonic acid derivative and a dispersing surfactant in a solvent. Such a blend generally has dodecyl benzene sulfonic acid (DDBSA) or a salt thereof as the major dispersant, i.e. anti-sludge, component.

The carrier fluids are aqueous solutions which in certain embodiments contain a Bronsted acid to keep the pH in the desired range and/or contain an inorganic salt, preferably NaCl or KCl.

Corrosion inhibitors may be selected from the group of amine and quaternary ammonium compounds and sulfur compounds. Examples are diethyl thiourea (DETU), which is suitable up to 185° F. (about 85° C.), alkyl pyridinium or quinolinium salt, such as dodecyl pyridinium bromide (DDPB), and sulfur compounds, such as thiourea or ammonium thiocyanate, which are suitable for the range 203-302° F. (about 95-150° C.), benzotriazole (BZT), benzimidazole (BZI), dibutyl thiourea, a proprietary inhibitor called TIA, and alkyl pyridines.

In general, the most successful inhibitor formulations for organic acids and chelating agents contain amines, reduced sulfur compounds or combinations of a nitrogen compound (amines, quats or polyfunctional compounds) and a sulfur compound. The amount of corrosion inhibitor is preferably between 0.1 and 2 vol %, more preferably between 0.1 and 1 vol % on the total foam or viscosified composition.

One or more corrosion inhibitor intensifiers may be added, such as for example formic acid, potassium iodide, antimony chloride, or copper iodide.

One or more salts may be used as rheology modifiers to further modify the rheological properties (e.g., viscosity and elastic properties) of the foams or compositions. These salts may be organic or inorganic.

Examples of suitable organic salts include, but are not limited to, aromatic sulfonates and carboxylates (such as p-toluene sulfonate and naphthalene sulfonate), hydroxynaphthalene carboxylates, salicylate, phthalate, chlorobenzoic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethyl ammonium hydrochloride, and tetramethyl ammonium chloride.

Examples of suitable inorganic salts include water-soluble potassium, sodium, and ammonium halide salts (such as potassium chloride and ammonium chloride), calcium chloride, calcium bromide, magnesium chloride, sodium formate, potassium formate, cesium formate, and zinc halide salts. A mixture of salts may also be used, but it should be noted that preferably chloride salts are mixed with chloride salts, bromide salts with bromide salts, and formate salts with formate salts.

Wetting agents that may be suitable for use in this invention include crude tall oil, oxidized crude tall oil, surfactants, organic phosphate esters, modified imidazolines and amidoamines, alkyl aromatic sulfates and sulfonates, and the like, and combinations or derivatives of these and similar such compounds that should be well known to one of skill in the art.

Further viscosifiers may include natural polymers and derivatives such as xanthan gum and hydroxyethyl cellulose (HEC) or synthetic polymers and oligomers such as poly(ethylene glycol) [PEG], poly(diallyl amine), poly(acrylamide), poly(aminomethyl propyl sulfonate) [AMPS polymer], poly(acrylonitrile), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinyl pyrrolidone), poly(vinyl lactam) and co-, ter-, and quarter-polymers of the following (co-)monomers: ethylene, butadiene, isoprene, styrene, divinyl benzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinyl pyrrolidone, and vinyl lactam. Still other viscosifiers include clay-based viscosifiers, platy clays like bentonites, hectorites or laponites and small fibrous clays such as the polygorskites (attapulgite and sepiolite). When using polymer-containing viscosifiers as further viscosifiers, the viscosifiers may be used in an amount of up to 5% by weight of the compositions of the invention.

Examples of suitable brines include calcium bromide brines, zinc bromide brines, calcium chloride brines, sodium chloride brines, sodium bromide brines, potassium bromide brines, potassium chloride brines, sodium nitrate brines, sodium formate brines, potassium formate brines, cesium formate brines, magnesium chloride brines, sodium sulfate, potassium nitrate, and the like. A mixture of salts may also be used in the brines, but it should be noted that preferably chloride salts are mixed with chloride salts, bromide salts with bromide salts, and formate salts with formate salts.

The brine chosen should be compatible with the formation and should have a sufficient density to provide the appropriate degree of well control.

Additional salts may be added to a water source, e.g., to provide a brine, and a resulting treatment foam, in order to have a desired density.

The amount of salt to be added should be the amount necessary for formation compatibility, such as the amount necessary for the stability of clay minerals, taking into consideration the crystallization temperature of the brine, e.g., the temperature at which the salt precipitates from the brine as the temperature drops.

Preferred suitable brines may include seawater and/or formation brines.

Salts may optionally be included in the foam or composition of the present invention for many purposes, including for reasons related to compatibility of the foam or composition with the formation and the formation fluids.

To determine whether a salt may be beneficially used for compatibility purposes, a compatibility test may be performed to identify potential compatibility problems.

From such tests, one of ordinary skill in the art will, with the benefit of this disclosure, be able to determine whether a salt should be included in a foam or composition of the present invention.

Suitable salts include, but are not limited to, calcium chloride, sodium chloride, magnesium chloride, potassium chloride, sodium bromide, potassium bromide, ammonium chloride, sodium formate, potassium formate, cesium formate, and the like. A mixture of salts may also be used, but it should be noted that preferably chloride salts are mixed with chloride salts, bromide salts with bromide salts, and formate salts with formate salts.

The amount of salt to be added should be the amount necessary for the required density for formation compatibility, such as the amount necessary for the stability of clay minerals, taking into consideration the crystallization temperature of the brine, e.g., the temperature at which the salt precipitates from the brine as the temperature drops.

Salt may also be included to increase the viscosity of the foam or composition and stabilize it, particularly at temperatures above 180° F. (about 82° C.).

Examples of suitable pH control additives which may optionally be included in the foam or composition of the present invention are acids and/or bases.

A pH control additive may be necessary to maintain the pH of the foam or composition at a desired level, e.g., to improve the effectiveness of certain breakers and to reduce corrosion on any metal present in the wellbore or formation, etc.

One of ordinary skill in the art will, with the benefit of this disclosure, be able to recognize a suitable pH for a particular application.

In one embodiment, the pH control additive may be an acidic composition. Examples of suitable acids may comprise an acid, an acid-generating compound, and combinations thereof.

Any known acid may be suitable for use with the foams or compositions of the present invention.

Examples of acids that may be suitable for use in the present invention include, but are not limited to, organic acids (e.g., formic acids, acetic acids, carbonic acids, citric acids, glycolic acids, lactic acids, p-toluene sulfonic acid, ethylene diamine tetraacetic acid ("EDTA"), hydroxyethyl ethylene diamine triacetic acid ("HEDTA"), and the like), inorganic acids (e.g., hydrochloric acid, hydrofluoric acid, phosphonic acid, and the like), and combinations thereof. Preferred acids are HCl (in an amount compatible with the illite content) and organic acids.

Examples of acid-generating compounds that may be suitable for use in the present invention include, but are not limited to, esters, aliphatic polyesters, ortho esters, which may also be known as ortho ethers, poly(ortho esters), which may also be known as poly(ortho ethers), poly(lactides), poly(glycolides), poly(epsilon-caprolactones), poly(hydroxybutyrates), poly(anhydrides), or copolymers thereof.

Derivatives and combinations also may be suitable.

The term "copolymer" as used herein is not limited to the combination of two polymers, but includes any combination of polymers, e.g., terpolymers and the like.

Other suitable acid-generating compounds include: esters including, but not limited to, ethylene glycol monoformate, ethylene glycol diformate, diethylene glycol diformate, glyceryl monoformate, glyceryl diformate, glyceryl triformate, methylene glycol diformate, and formate esters of pentaerythritol.

The pH control additive also may comprise a base to elevate the pH of the foam or viscosified composition.

Any known base that is compatible with the foaming agents or viscosifiers of the present invention can be used in the foam or viscosified composition of the present invention.

Examples of suitable bases include, but are not limited to, sodium hydroxide, potassium carbonate, potassium hydroxide, sodium carbonate, and sodium bicarbonate.

One of ordinary skill in the art will, with the benefit of this disclosure, recognize the suitable bases that may be used to achieve a desired pH elevation.

In some embodiments, the foam or composition may optionally comprise a further chelating agent.

When added, the chelating agent may chelate any dissolved iron (or other divalent or trivalent cations) that may be present and prevent any undesired reactions being caused.

Such a chelating agent may, e.g., prevent such ions from crosslinking the gelling agent molecules.

Such crosslinking may be problematic because, inter alia, it may cause filtration problems, injection problems and/or again cause permeability problems.

Any suitable chelating agent may be used with the present invention.

Examples of suitable chelating agents include, but are not limited to, citric acid, nitrilotriacetic acid ("NTA"), any form of ethylene diamine tetraacetic acid ("EDTA"), diethylene triamine pentaacetic acid ("DTPA"), propylene diamine tetraacetic acid ("PDTA"), ethylene diamine-N,N"-di(hydroxyphenyl) acetic acid ("EDDHA"), ethylene diamine-N,N"-di-(hydroxy-methylphenyl) acetic acid ("EDDHMA"), ethanol diglycine ("EDG"), trans-1,2-cyclohexylene dinitrilotetraacetic acid ("CDTA"), glucoheptonic acid, gluconic acid, sodium citrate, phosphonic acid, salts thereof, and the like.

In some embodiments, the chelating agent may be a sodium or potassium salt. Generally, the chelating agent may be present in an amount sufficient to prevent undesired side effects of divalent or trivalent cations that may be present, and thus also functions as a scale inhibitor.

One of ordinary skill in the art will, with the benefit of this disclosure, be able to determine the proper concentration of a chelating agent for a particular application.

In some embodiments, the foams or compositions of the present invention may contain bactericides or biocides, inter alia, to protect the subterranean formation as well as the foam or composition from attack by bacteria. Such attacks can be problematic because they may lower the viscosity of the foam, resulting in poorer performance, such as poorer sand suspension properties, for example.

Any bactericides known in the art are suitable. Biocides and bactericides that protect against bacteria that may attack GLDA, ASDA, MGDA or HEDTA are preferred, in addition to bactericides or biocides that control or reduce typical downhole microorganisms, like sulfate reducing bacteria (SRB).

An artisan of ordinary skill will, with the benefit of this disclosure, be able to identify a suitable bactericide and the proper concentration of such bactericide for a given application.

Examples of suitable bactericides and/or biocides include, but are not limited to, phenoxyethanol, ethylhexyl glycerine, benzyl alcohol, benzyl alkonium, methyl chloroisothiazolinone, methyl isothiazolinone, methyl paraben, ethyl paraben, propylene glycol, bronopol, benzoic acid, imidazolinidyl urea, a 2,2-dibromo-3-nitrilopropionamide, and a 2-bromo-2-nitro-1,3-propane diol. In one embodiment, the bactericides are present in the foam in an amount in the range of from about 0.001% to about 1.0% by weight of the foam or composition.

Foams and compositions of the present invention also may comprise breakers capable of assisting in the reduction of the viscosity of the foam or viscosified composition at a desired time.

Examples of such suitable breakers for the present invention include, but are not limited to, oxidizing agents such as sodium chlorites, sodium bromate, hypochlorites, perborate, persulfates, and peroxides, including organic peroxides. Other suitable breakers include, but are not limited to, suitable acids and peroxide breakers, triethanol amine, as well as enzymes that may be effective in breaking. The breakers can be used as is or encapsulated.

Examples of suitable acids may include, but are not limited to, hydrochloric acid, hydrofluoric acid, formic acid, acetic acid, citric acid, lactic acid, glycolic acid, chlorous acid, etc.

A breaker may be included in the foam or composition of the present invention in an amount and form sufficient to achieve the desired viscosity reduction at a desired time.

The breaker may be formulated to provide a delayed break, if desired.

The foams or compositions of the present invention also may comprise suitable fluid loss additives.

Such fluid loss additives may be particularly useful when a foam or composition of the present invention is used in a fracturing application or in a foam or composition that is used to seal a formation against invasion of fluid from the wellbore.

Any fluid loss agent that is compatible with the compositions of the present invention is suitable for use in the present invention.

Examples include, but are not limited to, starches, silica flour, gas bubbles (energized fluid or foam), benzoic acid, soaps, resin particulates, relative permeability modifiers, degradable gel particulates, diesel or other hydrocarbons dispersed in fluid, and other immiscible fluids.

Another example of a suitable fluid loss additive is one that comprises a degradable material.

Suitable examples of degradable materials include polysaccharides such as dextran or cellulose; chitins; chitosans; proteins; aliphatic polyesters; poly(lactides); poly(glycolides); poly(glycolide-co-lactides); poly(epsilon-caprolactones); poly(3-hydroxybutyrates); poly(3-hyd roxybutyrate-co-hyd roxyvalerates); poly(anhydrides); aliphatic poly (carbonates); poly(ortho esters); poly(amino acids); poly (ethylene oxides); poly(phosphazenes); derivatives thereof; or combinations thereof.

In some embodiments, a fluid loss additive may be included in an amount of about 5 to about 2,000 lbs/Mgal (about 600 to about 240,000 g/Mliter) of the foam or composition.

In some embodiments, the fluid loss additive may be included in an amount from about 10 to about 50 lbs/Mgal (about 1,200 to about 6,000 g/Mliter) of the foam or composition.

In certain embodiments, a stabilizer may optionally be included in the foams or compositions of the present invention.

It may be particularly advantageous to include a stabilizer if a (too) rapid viscosity degradation is experienced.

One example of a situation where a stabilizer might be beneficial is where the BHT (bottom hole temperature) of the wellbore is sufficient to break the foam or composition by itself without the use of a breaker.

Suitable stabilizers include, but are not limited to, sodium thiosulfate, methanol, and salts such as formate salts and potassium or sodium chloride.

Such stabilizers may be useful when the foams or compositions of the present invention are utilized in a subterranean formation having a temperature above about 200° F. (about 93° C.). If included, a stabilizer may be added in an amount of from about 1 to about 50 lbs/Mgal (about 120 to about 6,000 g/Mliter) of the foam or composition.

Scale inhibitors may be added, for example, when the foams or compositions of the invention are not particularly compatible with the formation waters in the formation in which they are used.

These scale inhibitors may include water-soluble organic molecules with carboxylic acid, aspartic acid, maleic acids, sulfonic acids, phosphonic acid, and phosphate ester groups including copolymers, ter-polymers, grafted copolymers, and derivatives thereof.

Examples of such compounds include aliphatic phosphonic acids such as diethylene triamine penta(methylene phosphonate) and polymeric species such as polyvinyl sulfonate.

The scale inhibitor may be in the form of the free acid but is preferably in the form of mono- and polyvalent cation salts such as Na, K, Al, Fe, Ca, Mg, $NH_4$. Any scale inhibitor that is compatible with the foam or composition in which it will be used is suitable for use in the present invention.

Suitable amounts of scale inhibitors that may be included may range from about 0.05 to 100 gallons per about 1,000 gallons (i.e. 0.05 to 100 liters per 1,000 liters) of the foam or composition.

Any particulates such as proppant, gravel, that are commonly used in subterranean operations may be used in the present invention (e.g., sand, gravel, bauxite, ceramic materials, glass materials, wood, plant and vegetable matter, nut hulls, walnut hulls, cotton seed hulls, cement, fly ash, fibrous materials, composite particulates, hollow spheres and/or porous proppant).

It should be understood that the term "particulate" as used in this disclosure includes all known shapes of materials including substantially spherical materials, oblong, fibre-like, ellipsoid, rod-like, polygonal materials (such as cubic materials), mixtures thereof, derivatives thereof, and the like.

In some embodiments, coated particulates may be suitable for use in the treatment foams of the present invention. It should be noted that many particulates also act as diverting agents. Further diverting agents are viscoelastic surfactants and in-situ gelled fluids.

Oxygen scavengers may be needed to enhance the thermal stability of the GLDA, ASDA, HEDTA or MGDA. Examples thereof are sulfites and ethorbates.

Friction reducers can be added in an amount of up to 0.2 vol %. Suitable examples are viscoelastic surfactants and enlarged molecular weight polymers.

Further crosslinkers can be chosen from the group of multivalent cations that can crosslink polymers such as Al, Fe, B, Ti, Cr, and Zr, or organic crosslinkers such as polyethylene amides, formaldehyde.

Sulfide scavengers can suitably be an aldehyde or ketone.

Viscoelastic surfactants can be chosen from the group of amine oxides, carboxyl butane-based, or betaine surfactants.

High-temperature applications may benefit from the presence of an oxygen scavenger in an amount of less than about 2 vol % of the solution.

At the same time, the foams and viscosified compositions can be used at an increased pressure. Often foams and viscosified compositions are pumped into the formation under pressure. Preferably, unless the process performed is a fracturing process, the pressure used is below fracture pressure, i.e. the pressure at which a specific formation is susceptible to fracture. Fracture pressure can vary a lot depending on the formation treated, but is well known by the person skilled in the art.

In the process of the invention, the foam or composition can be flooded back from the formation. Even more preferably, (part of) the foam or composition is recycled.

It must be realized, however, that GLDA, ASDA and MGDA, being biodegradable chelating agents, will not flow back completely and therefore are not recyclable to the full extent.

The invention is further illustrated by the Examples below.

EXAMPLES

Part I. Foaming Tests

Example I.1

The foam formation was measured by shaking 25 ml of a solution containing 18 wt % GLDA (pH=4), 18 wt % HEDTA (pH=4) or 15 wt % HCl and 2,000 ppm of a foaming surfactant (Witconate AOS, available from AkzoNobel Surface Chemistry) in a 100 ml glass cylinder. Prior to shaking the fluid was preheated to 93° C. The foam formation was checked visually. Both chelating agents produced a higher volume of foam that was more stable than HCl under identical conditions.

Examples I.2-I.12

Abbreviations
SDS: Sodiumdodecylsulfate
SDBS: Sodiumdodecylbenzenesulfonate
LOH: Lauryl alcohol
CMC: carboxymethylcellulose
BSA: bovine serum albumin
Stock Solutions:
GLDA stock: 36.5 wt % GLDA in water, pH about 3.8

ASDA stock: 31.8 wt % ASDA in water, pH about 3.8
HCl stock: 15 wt % in water
CMC stock 2%: 2 wt %, HV DS Staflo Regular, ex Akzonobel 2013, in water Method 1 for Making Foam:

Mix all the components for the recipe in a beaker. Add water until a volume of 100 ml is obtained and heat to 90° C. Add about 40 ml in a measuring cylinder. Make a foam by intense mixing of the mixture with air, typical mixing time is 1-2 minutes. Intense mixing is supplied by an "Ultra Turrax T25" rotor stator as produced by IKA®-Werke GmbH & Co. KG.

Method 2 for Making Foam:

Mix all the components for the recipe, apart from the GLDA stock, in a beaker. Add water until a volume of 100 ml is obtained and heat to 90° C. Add about 20 ml in a measuring cylinder. Make a foam by intense mixing of the mixture with air, typical mixing time is 1-2 minutes. Continue intense mixing and add about 20 ml GLDA stock heated to 90° C. Total mixing time is typically 3-4 minutes. Intense mixing is supplied by an "Ultra Turrax T25" rotor stator as produced by IKA®-Werke GmbH & Co. KG.

Foam Stability Experiment

For the foam stability experiment the freshly produced foam of 90° C. is placed in an oven at 95° C. The measuring cylinder is closed at the top using aluminum foil. Often at the beginning of the experiment the cylinder is filled with foam only. During the experiment the foam destabilizes and a liquid layer is formed at the bottom with a foam layer on top. The height of the liquid layer and of the liquid and foam layers is measured in time. This data is used to report the:

Foam height t=0:00 value (Fh0):
  height of column of the liquid plus foam of the freshly produced sample.
Liquid height t=0:00 value (Lh0):
  height of the liquid column of the freshly produced sample.
Half life: Time that the height of the liquid plus foam column is equal to $$Lh0 + (Fh0 - Lh0)/2.$$

End time: Time that foam has disappeared.

Samples 2-12 were prepared for Examples I.2-12:

TABLE 1

Formulations and process method for Examples I: 2-12.

| Sample No | Method | GLDA stock [ml] | ASDA stock [ml] | HCl stock [ml] | CMC stock 2% [ml] | SDS [g] | SDBS [g] | LOH [g] | BSA [g] |
|---|---|---|---|---|---|---|---|---|---|
| 2 | 1 | 50 | | | 33 | | 5 | 0.5 | |
| 3 | 1 | 50 | | | 33 | 5 | | 0.5 | |
| 4 | 1 | 0 | | | 33 | | 5 | 0.5 | |
| 5 | 1 | 0 | | | 33 | 5 | | 0.5 | |
| 6 | 1 | | | 59 | 33 | 5 | | 0.5 | |
| 7 | 1 | 50 | | | 33 | 5 | | 0 | |
| 8 | 2 | 50 | | | 33 | 5 | | 0.5 | |
| 9 | 2 | 50 | | | 33 | | | | 2 |
| 10 | 1 | 50 | | | 33 | 5 | | 0.5 | |
| 11 | 1 | 50 | | | 33 | 1 | | 0.5 | |
| 12 | 1 | | 50 | | 33 | 5 | | 0.5 | |

The results of the foam stability measurements are listed in Table 2. For all samples the value for the height of the liquid column at t=0 was equal to 0 ml and is not reported in the column.

TABLE 2

Observations of foam stability. The height is measured in ml as written on the measuring cylinder. The column "total volume t = 0:00" lists the height of liquid plus foam at the beginning of the foam stability experiment in the oven at 95° C. "half life" and "end time" are defined in the text and are measures for the foam stability.

| Sample no | Surfactant | Liquid t = 0:00 [ml] | Total volume t = 0:00 [ml] | Gas [vol %] | half life [hh:mm] | end time [hh:mm] |
|---|---|---|---|---|---|---|
| 2 | SDBS | 30 | 52 | 42 | 2:06 | >2:00 |
| 3 | SDS | 30 | 55 | 45 | >2:00 | >2:00 |
| 4 | SDBS | 41 | 80 | 49 | 0:25 | 1:20 |
| 5 | SDS | 41 | 80 | 49 | 1:00 | 1:20 |
| 6 | SDS | 40 | 95 | 58 | 0:20 | 0:27 |
| 7 | SDS | 40 | 64 | 38 | 1:41 | 2:07 |
| 8 | SDS | 38 | 78 | 51 | 2:25 | 4:10 |
| 9 | BSA | 24 | 70 | 66 | 2:34 | 3:50 |
| 10 | SDS | 39 | 80 | 51 | 3:09 | >3:20 |
| 11 | SDS | 38 | 58 | 34 | 1:12 | 2:25 |
| 12 | SDS | 39 | 70 | 44 | 1:20 | 1:46 |

It was surprisingly found that:
1) Using GLDA, temperature-stable foams are formed with very different foaming agents, such as surfactants and proteins and at different concentrations of the foaming agent.
2) Foaming stability is improved by the addition of a low HLB, low water-soluble co-surfactant such as LOH, compare Example 3 and 7
3) Surprisingly, it was found that mixtures with GLDA form a more stable foam than mixtures without GLDA, compare Examples 2-3 and 4-5.
4) Foams containing GLDA are much more stable than foams based on HCl, compare Example 3 and 6.
5) Surprisingly, it was found that method 2 produces a more stable foam than method 1, compare Example 3 and 8
6) Surprisingly, it was found that increasing the concentration of SDS from 1 to 5 wt % improves the stability of the foam at elevated temperature, compare Example 3 and 11
7) Temperature-stable foam can be made with ASDA as well. However, surprisingly it was found that the GLDA foams are more stable than the ASDA foams, compare Example 3 and 12

Part II. Gelling Test

Example II.1

To examine the possibility of forming a viscosified composition 1.5 wt % of a gelling agent (Gabroil PAC Hivis, available from AkzoNobel Cellulosic Specialties) was added to a 18 wt % GLDA (pH=4) solution at a temperature of 20° C., resulting in a highly viscous solution as determined by visual inspection.

Example II.2

Experimental Set-Up for Viscosity Measurements of Gelling Agents—Chelate Based Acids Formulations were made of gelling agents and chelating agents in order to determine the viscosity of the mixtures at 30° C. and 80° C. at two shear rates. The viscosity measurements were done by using an AR2000 rheometer from TA instruments using a cone and plate geometry. The cone was stainless steel with a 40 mm diameter and a 4° angle (SST 40 mm 4°). Heating was done using a Peltier element. The viscosities of the mixtures were measured except for HCl mixtures, as the system was not corrosion-resistant enough.

In order to enable comparisons with the HCl solutions also adapted cup viscosity measurements were done in which the HCl/gelling agent mixtures were compared with water/gelling agent mixtures and GLDA/gelling agent mixtures.

Abbreviations
GLDA=Glutamic acid-N,N-DiAcetic acid
HEDTA=Hydroxyethyl-EthyleneDiamineTriAcetic acid
EDTA=EthyleneDiamineTetraAcetic acid
ASDA=Aspartic Diacetic Acid
CMC=carboxymethyl cellulose The following starting gelling agent solutions in demineralized water were used:

| | |
|---|---|
| xanthan | 1% (XCD Polymer ex NAM, 2009) |
| guar | 1% (Jaguar 308NB ex TBC-Brinadd, 2012) |
| CMC Low Viscous (CMC-LV) | 4% (Staflo Exio Supreme, ex AkzoNobel, 2013) |
| CMC High viscous (CMC-HV) | 2% (Staflo Regular, ex AkzoNobel, 2013) |

The solutions were stabilized with 1 mmolar sodium azide on total solution. 3 ml of 0.65% sodium azide were added per 300 ml of final solution of the gelling agents.

The following chelating agent/acid solutions in water were used:

| | | |
|---|---|---|
| GLDA | 36.5% GLDA | pH as such = 3.85 |
| HEDTA | 38.4% HEDTA | pH as such = 3.8 |
| ASDA | 31.5% ASDA | pH as such = 3.8 |
| EDTA | 9.07% EDTA | pH as such = 4.2 |
| HCl | 22.5% HCl | |

Water was used as reference.

The concentrations of the starting chelating agent solutions differed from each other both on weight basis and on molar basis. Three of the chelate concentrations were converted to equal molar concentrations in the gelling agent/chelating agent mixtures in order to be able to compare the mixtures: GLDA, HEDTA, and ASDA. The final concentration in the mixtures was 0.774 mol/kg. The starting saturated EDTA concentration in water is only 100 g in 1 liter, which is a 9.07 wt % solution; the solubility of EDTA is too low to reach a higher final concentration. The total intake in all cases was 90 grams. HCl and water were used as references. The following compositions were made as shown in Table 3:

TABLE 3 gelling agent and acid mixtures as used in the viscosity measurements

| Samples | chelating agent/acid | intake chelating agent/acid [g] | intake water [g] | intake gelling agent* [g] | content chelating agent/acid [mol/kg] | content chelating agent/acid [% by weight] |
|---|---|---|---|---|---|---|
| 2a-d | GLDA | 54.50 | 5.50 | 30 | 0.774 | 22.1 |
| 3a-d | HEDTA | 58.47 | 1.53 | 30 | 0.774 | 25.0 |
| 4a-d | ASDA | 60 | 0 | 30 | 0.774 | 21.0 |
| 5a-d | EDTA | 60 | 0 | 30 | 0.179 | 6.7 |
| 6a-d | HCl | 60 | 0 | 30 | 4.110 | 15.0 |
| 7a-d | Reference water | 0 | 60 | 30 | 0 | 0.0 |

*The concentrations of the gelling agents in the formulations were, respectively: (a) xanthan 0.33%, (b) guar 0.33%, (c) CMC LV 1.33%, and (d) CMC HV 0.67%.

The formulations were mixed until homogeneous and the viscosity determined at and 80° C. with the AR2000 rheometer. In Table 4 the viscosity measurements are given of the 30° C. measurements measured at a shear rate 39.8 1/s and in Table 5 they were measured at a shear rate 100 1/s. The results of the 80° C. viscosity measurements measured with a shear rate of 39.8 1/s are given in Table 6 and those measured with a shear rate of 100 1/s are given in Table 7. The measurements at shear rates 39.8 1/s and 100 1/s were found to be good representatives of the total rheograms taken.

TABLE 4 viscosity measurements at 30° C./39.8 1/s shear rate of the gelling agent and chelating agent mixtures

| | | viscosity 30° C. at shear rate 39.8 1/s with gelling agents [mPa · s] | | | |
|---|---|---|---|---|---|
| sample | chelating agent | (a) xanthan 0.33% | (b) guar 0.33% | (c) CMC-LV 1.33% | (d) CMC-HV 0.67% |
| 2 | GLDA | 148 | 86 | 423 | 506 |
| 3 | HEDTA | 140 | 57 | 392 | 599 |
| 4 | ASDA | 140 | 55 | 461 | 588 |
| 5 | EDTA | 102 | 72 | 170 | 223 |
| 7 | reference water | 133 | 55 | 217 | 303 |

TABLE 5 viscosity measurements at 30° C./100 1/s shear rate of the gelling agent and chelating agent mixtures

| | | viscosity 30° C. at shear rate 100 1/s with gelling agents [mPa · s] | | | |
|---|---|---|---|---|---|
| sample | chelating agent | (a) xanthan 0.33% | (b) guar 0.33% | (c) CMC-LV 1.33% | (d) CMC-HV 0.67% |
| 2 | GLDA | 85 | 67 | 308 | 308 |
| 3 | HEDTA | 80 | 53 | 287 | 361 |
| 4 | ASDA | 81 | 39 | 329 | 352 |
| 5 | EDTA | 55 | 39 | 134 | 149 |
| 7 | reference water | 71 | 43 | 165 | 190 |

At 30° C. it can be observed at both shear rates that when the gelling agents xanthan, CMC-LV or CMC HV are mixed with the chelating agents GLDA, HEDTA or ASDA, they show a higher viscosity than water. The difference is more pronounced when either CMC-LV or CMC-HV is used in the mixtures. It appears that the addition of these chelating agents have a positive effect on the viscosity of the mixtures. The mixtures containing EDTA show a lower viscosity than water. The guar viscosities are significantly lower than those of the other gelling agents, resulting in smaller differences between the different acids.

TABLE 6 viscosity measurements at 80° C./39.8 1/s shear rate of the gelling agent and chelating agent mixtures

| | | viscosity 80° C. at shear rate 39.8 1/s with gelling agents [mPa · s] | | | |
|---|---|---|---|---|---|
| sample | chelating agent | (a) xanthan 0.33% | (b) guar 0.33% | (c) CMC-LV 1.33% | (d) CMC-HV 0.67% |
| 2 | GLDA | 112 | 20 | 67 | 123 |
| 3 | HEDTA | 101 | 27 | 75 | 158 |
| 4 | ASDA | 94 | 22 | 81 | 144 |
| 5 | EDTA | 80 | 18 | 32 | 49 |
| 7 | reference water | 73 | 25 | 54 | 105 |

TABLE 7 viscosity measurements at 80° C./100 1/s shear rate of the gelling agent and chelating agent mixtures

| | | viscosity 80° C. at shear rate 100 1/s with gelling agents [mPa · s] | | | |
|---|---|---|---|---|---|
| sample | chelating agent | (a) xanthan 0.33% | (b) guar 0.33% | (c) CMC-LV 1.33% | (d) CMC-HV 0.67% |
| 2 | GLDA | 62 | 25 | 65 | 98 |
| 3 | HEDTA | 56 | 18 | 66 | 119 |
| 4 | ASDA | 53 | 9 | 72 | 110 |
| 5 | EDTA | 43 | 13 | 29 | 41 |
| 7 | reference water | 44 | 16 | 48 | 80 |

At both shear rates at 80° C. GLDA, HEDTA, and ASDA with the gelling agents xanthan and CMC-HV and CMC-LV still show a higher viscosity than water and the EDTA/gelling agent mixtures.

At 80° C. it can be observed at both shear rates that the mixtures containing EDTA show a far lower viscosity than water when the gelling agents are CMC-LV or CMC HV. With xanthan the EDTA no longer has a lower viscosity than the water/xanthan mixture. At the 39.8 1/s shear rate the viscosity of EDTA is even a little higher than that of water and at 100 1/s the viscosity is comparable.

The guar viscosities are again significantly lower than those of the other gelling agents, resulting in smaller differences between the acids. At these lower viscosities the measurements at 80° C. show relatively more spread than at 30° C.

Measuring the HCl/gelling agent mixtures

Mixtures were made of the HCl solution with the gelling agents. Both xanthan and guar were easily miscible with the HCl solution. Both CMC-LV and CMC-HV were found to be troublesome to mix with the HCl solution. Even after two hours of stirring with a glass turbine mixer, the gel would not mix. Upon standing over the weekend the solution had become homogeneous and lost its viscosity.

The HCl mixtures were measured using an adapted cup viscosity. As cup a 30 ml syringe (BD Plastipak) was used (with the plunger removed). The syringe was filled with the liquid. When the liquid flowed out of the syringe, the time was started at 20 ml marking and ended at 10 ml marking. The opening at the bottom of the syringe is ca 1.5 mm wide. When plain de-mineralized water is measured, the flow time is 6.36 seconds.

TABLE 8 cup viscosity measurements at 20° C. of acid/gelling agent mixtures

| | | cup viscosity at 20° C. with gelling agents [seconds] | | | |
|---|---|---|---|---|---|
| sample | chelating agent/acid | (a) xanthan 0.33% | (b) guar 0.33% | (c) CMC-LV 1.33% | (d) CMC-HV 0.67% |
| 2 | GLDA | 210.83 | 52.06 | 256.41 | 455.85 |
| 6 | HCl | 14.93 | 6.57 | 7.40 | 6.58 |
| 7 | reference water | 46.37 | 15.04 | 123.91 | 210.95 |

The mixtures of gelling agent and HCl showed a very poor viscosity. The mixtures with guar, CMC-LV and CMC-HV are comparable to plain water. The mixture with xanthan has a higher viscosity than plain water but a lower one than the reference water/xanthan mixture. The mixtures of the gelling agents with GLDA show a significantly higher cup viscosity than the reference water mixtures.

CONCLUSIONS

When gelling agents solutions are mixed with chelating agents, solutions having a pH 3.8-4.2 or HCl, the following is observed:

GLDA, HEDTA, and ASDA have a viscosity-increasing effect when they are mixed with xanthan, low-viscosity CMC or high-viscosity CMC in comparison with a gelling agent/water mixture. This effect can be seen both at 30° C. and at 80° C.

At 30° C. it appears that EDTA has a viscosity-lowering effect when it is mixed with xanthan, low-viscosity CMC or high-viscosity CMC in comparison with a gelling agent/water mixture.

At 80° C. it appears that EDTA no longer lowers the viscosity when it is mixed with xanthan. In these cases the viscosity is equal or even a little higher than for the gelling agent/water mixtures. Still, the viscosities measured for the EDTA/xanthan mixture are lower than the viscosities measured for the GLDA, HEDTA or ASDA/xanthan mixtures The viscosities of acids/guar mixtures are generally lower than combinations with other gelling agents. Also, the differences between the acids/guar mixtures are smaller. Nevertheless, gelling chelating acid based acidic solutions with guar was proven possible.

HCl has a strong decreasing effect on the cup viscosity when mixed with xanthan, guar, low-viscosity CMC or high-viscosity CMC. Only with xanthan a rudimentary amount of viscosity remains. With the other three gelling agent mixtures the gelling activity seems no longer to exist, as the cup viscosity is almost equal to that of plain water.

The invention claimed is:

1. Foam containing water, between 5 and 30 wt % on total weight of the foam of a chelating agent selected from the group of glutamic acid N,N-diacetic acid or a salt thereof (GLDA), aspartic acid N,N-diacetic acid or a salt thereof (ASDA), methylglycine N,N-diacetic acid or a salt thereof (MGDA), N-hydroxyethyl ethylenediamine-N,N',N'-triacetic acid or a salt thereof (HEDTA), a foaming agent, and at least 25 vol % on total volume of the foam of a gas and having a pH of between 2 and 5 wherein the amount of foaming agent is between 10 ppm and 200,000 ppm on total foam weight.

2. Foam of claim 1, wherein the gas is $N_2$, $CO_2$, air or natural gas.

3. Foam of claim 1, having a temperature of between 77 and 400° F.

4. Viscosified composition containing water, between 5 and 30 wt % on total weight of the composition of a chelating agent selected from the group of glutamic acid N,N-diacetic acid or a salt thereof (GLDA), aspartic acid N,N-diacetic acid or a salt thereof (ASDA), methylglycine N,N-diacetic acid or a salt thereof (MGDA), and at least 0.01 wt % on total weight of the composition of a viscosifying agent, and having a pH of between 2 and 5.

5. Viscosified composition of claim 4, wherein the viscosifying agent is selected from the group of consisting of cellulosic derivatives, guar or guar derivatives, xanthan, carrageenan, starch polymers, gums, polyacrylamides, polyacrylates, betaine-based surfactants, viscoelastic surfactants, natural clays and synthetic clays.

6. Viscosified composition of claim 4, wherein the amount of viscosifying agent is more than 0.01 and up to 2 wt % on total composition weight.

7. Viscosified composition of claim 4, having a temperature of between 77 and 400° F.

8. Viscosified composition of claim 4, wherein the viscosifying composition in addition contains a further additive from the group of foam extenders, crosslinking agents, anti-sludge agents, surfactants, corrosion inhibitors, mutual solvents, corrosion inhibitor intensifiers, foaming agents, viscosifiers, wetting agents, diverting agents, oxygen scavengers, carrier fluids, fluid loss additives, friction reducers, stabilizers, rheology modifiers, gelling agents, scale inhibitors, breakers, salts, brines, pH control additives, bactericides/biocides, particulates, crosslinkers, salt substitutes, relative permeability modifiers, sulfide scavengers, fibres, nanoparticles, and consolidating agents.

9. Viscosified composition of claim 8, wherein the amount of corrosion inhibitor is more than 0 and up to 2 vol % on total volume.

10. Foam or of claim 1, wherein the foam in addition contains a further additive from the group of foam extenders, crosslinking agents, anti-sludge agents, surfactants, corrosion inhibitors, mutual solvents, corrosion inhibitor intensifiers, foaming agents, viscosifiers, wetting agents, diverting agents, oxygen scavengers, carrier fluids, fluid loss additives, friction reducers, stabilizers, rheology modifiers, gelling agents, scale inhibitors, breakers, salts, brines, pH control additives, bactericides/biocides, particulates, crosslinkers, salt substitutes, relative permeability modifiers, sulfide scavengers, fibres, nanoparticles, and consolidating agents.

11. Foam of claim 10, wherein the amount of corrosion inhibitor is more than 0 and up to 2 vol % on total volume.

* * * * *